United States Patent

Maruyama et al.

[11] Patent Number: 6,105,711
[45] Date of Patent: Aug. 22, 2000

[54] POWER STEERING SYSTEM

[75] Inventors: Tatsuyoshi Maruyama; Susumu Kimoto; Takayuki Yoshida, all of Kanagawa, Japan

[73] Assignee: Unisia Jecs Corporation, Atsugi, Japan

[21] Appl. No.: 09/172,771

[22] Filed: Oct. 15, 1998

[30] Foreign Application Priority Data

Oct. 15, 1997 [JP] Japan .................... 9-296440

[51] Int. Cl.$^7$ .................................................. B62D 5/06
[52] U.S. Cl. ........................................ 180/421; 180/417
[58] Field of Search ............................... 180/421, 417, 180/428, 429, 441, 442; 91/375 R, 375 A

[56] References Cited

U.S. PATENT DOCUMENTS

| | | | |
|---|---|---|---|
| 4,607,717 | 8/1986 | Nakayama | 180/141 |
| 4,790,401 | 12/1988 | Sonoda | 180/142 |
| 5,135,068 | 8/1992 | Emori et al. | 180/132 |
| 5,330,024 | 7/1994 | Emori et al. | 180/141 |
| 5,348,110 | 9/1994 | Klein et al. | 180/132 |

FOREIGN PATENT DOCUMENTS

95/11153  4/1995  WIPO .

Primary Examiner—J. J. Swann
Assistant Examiner—Michael Cuff
Attorney, Agent, or Firm—Foley & Lardner

[57] ABSTRACT

In a power steering system of this invention, a control valve is provided for supplying working fluid to a power cylinder by an amount proportional to a steering effort supplied to an input shaft and obstructing supply of working fluid to the power cylinder when a steering wheel is in a neutral position. A conversion mechanism which includes an operation rod (operating device) capable of operating the control valve is provided for converting the steering effort supplied to the input shaft to displacement of the operation rod. A directional control valve is provided which is disposed between the control valve and the power cylinder for switching supply of working fluid from one of cylinder chambers of the power cylinder to the other according to the direction of the steering effort on the input shaft while controlling discharge of working fluid from the cylinder chambers.

14 Claims, 4 Drawing Sheets

POWER STEERING SYSTEM

BACKGROUND OF THE INVENTION

1. Field of the Invention

The present invention relates to a power steering system for automotive vehicles, particularly of the kind having a control valve which is adapted to shut off supply of working oil or fluid to a power cylinder when a steering wheel is in the neutral position, i.e., when steering in the straight-ahead position.

2. Description of the Related Art

This kind of power steering system as for example disclosed in PCT pamphlet WO95/11153 is known.

The above described prior art power steering system is constructed such that working fluid is supplied to or discharged from a power cylinder in response to a steering effort on an input haft of a steering gear for thereby providing a steering assist. The power steering system is thus provided with a control valve for controlling supply of working fluid to the power cylinder and shutting off the supply of working fluid to the power cylinder when steering in the straight-ahead position. A pair of such control valves are provided so as to be operated selectively in response to a steering effort for turning to the right and to the left, respectively.

The above described prior art power steering system is constructed so that one of the control valves opens in response to a steering effort for turning to the left or to the right, e.g., in response to a steering effort for turning to the left to introduce working fluid to a left-hand cylinder chamber of a power cylinder and thereby provide a steering assist for assisting the steering effort for turning to the left, whereas the other of the control valves opens in response to a steering effort for turning to the right to introduce working fluid to a right-hand cylinder chamber of the power cylinder and thereby provide a steering assist for assisting the steering effort for turning to the right.

However, since the above described prior art power steering system requires two control valves, one of which opens at the time of steering for turning to the left and the other opens at the time of steering for turning to the right, it is liable to become larger in the overall size, requires a number of constituent parts and thus possibly increases in manufacturing cost.

SUMMARY OF THE INVENTION

According to an aspect of the present invention, there is provided a power steering system for providing a steering assist through control of supply and discharge of working fluid to and from a pair of cylinder chambers of a power cylinder in response to a steering effort on an input shaft of a steering gear. The power steering system comprises a conversion mechanism having an operating device, for converting a steering effort on the input shaft to movement of the operating device, a control valve operatively connected to the operating device for controlling the supply and discharge of working fluid to and from the cylinder chambers of the power cylinder in response to the movement of the operating device, the control valve shutting off the supply of working fluid to the power cylinder when steering in a straight-ahead position, and a directional control valve disposed between the control valve and the power cylinder for switching the supply of working fluid from one of the cylinder chambers to the other in response to a change of a direction of steering effort on the input shaft while controlling discharge of working fluid from the cylinder chambers.

With the above structure, the operating device of the conversion mechanism operates the control valve in response to a steering effort on the input shaft of the steering gear. When the control valve is operated to open, working fluid is introduced from the control valve to the power cylinder by way of the directional control valve. The directional control valve selects one of the cylinder chambers to be supplied with working fluid in response to the direction of the steering effort on the input shaft. Thus, the power cylinder provides a steering assist in response to a steering effort on the input shaft, i.e., steering or turning of a steering wheel in one or another direction. In this connection, it is to be noted that only one control valve controls supply of working fluid to the pair of cylinder chambers of the power cylinder and is operated irrespective of the direction of steering, i.e., in both cases of right-hand turn and left-hand turn and in response to the steering effort. Accordingly, the power steering system can be small in the overall size and can be low in the manufacturing cost.

The above structure is effective for overcoming the above noted problem inherent in the prior art device.

It is accordingly an object of the present invention to provide a novel and improved power steering system which is small in the overall size and low in the manufacturing cost.

DETAILED DESCRIPTION OF THE PREFERRED EMBODIMENT

Referring to FIGS. 1 to 5, inclusive, a power steering system according to an embodiment of the present invention will be described.

Figure 1:
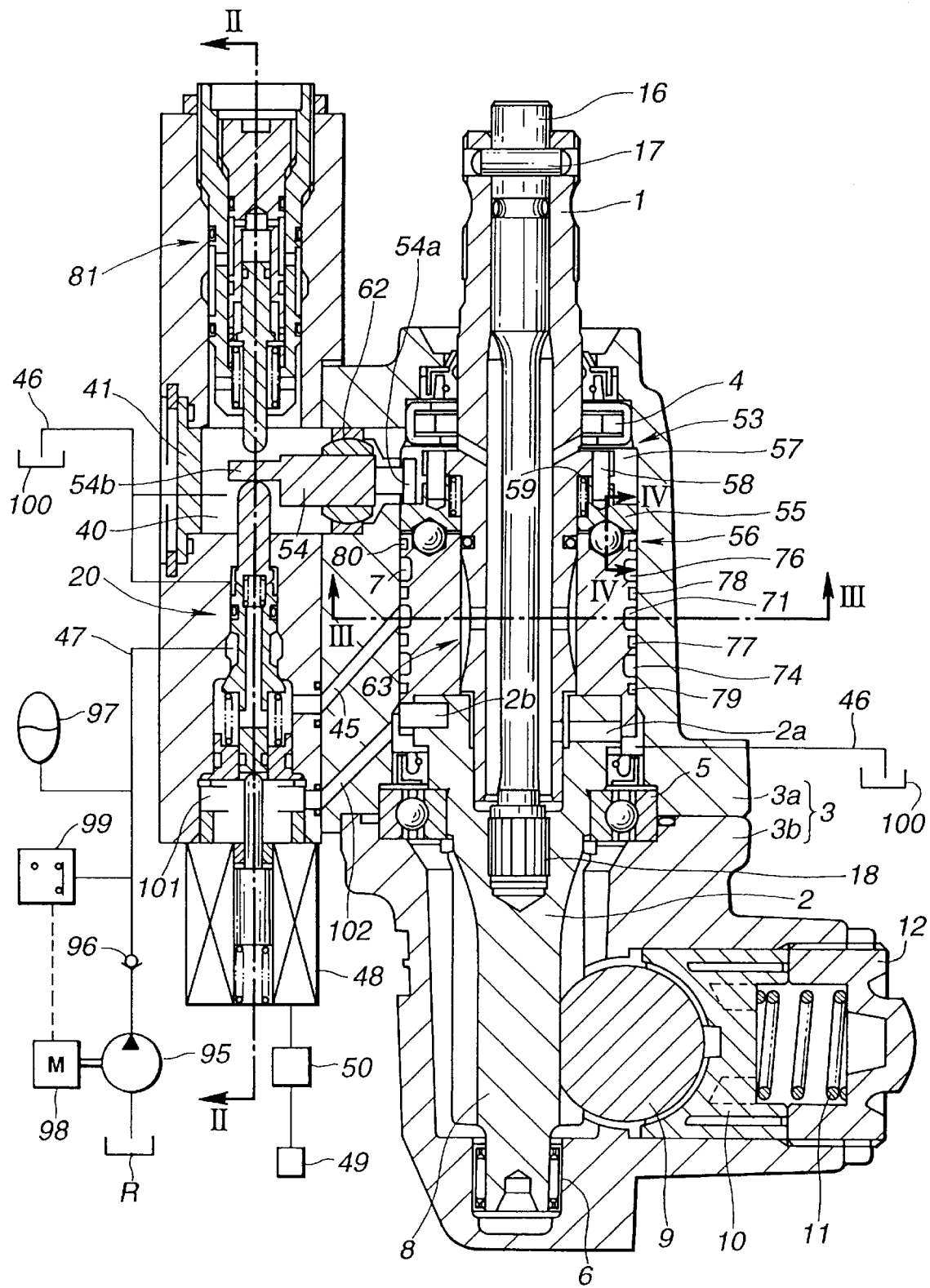
FIG. 1 is a cross sectional view of a power steering system according to an embodiment of the present invention.
Figure 2:
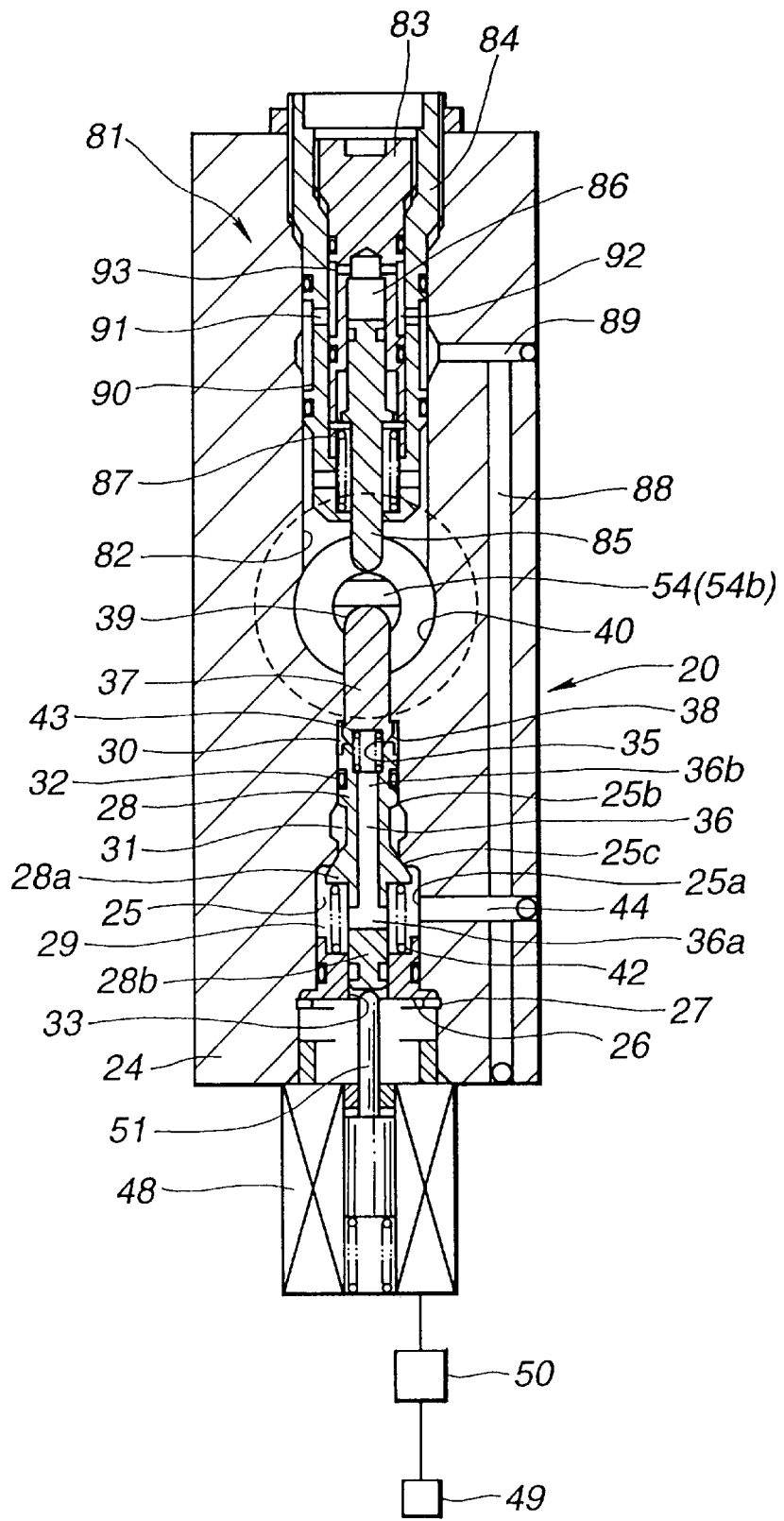
FIG. 2 is a cross sectional view taken along line II—II of FIG. 1.

In FIG. 1, indicated by 1 is a hollow input shaft 1 of a steering gear. The input shaft is connected to a steering wheel (not shown) so as to receive therefrom a steering torque or effort. Indicated by 2 is an output shaft of the steering gear coupled with the input shaft 1 so as to be rotatable relative thereto. The input shaft 1 and output shaft 2 are housed rotatably in a housing 3 which consists of a valve housing 3a and a gear housing 3b. Indicated by 4, 5 and 6 are bearings for supporting the input shaft 1 and output shaft 2.

The output shaft 2 consists of a valve sleeve 7 fitted on the input shaft 1 and a pinion shaft 8 meshed with a rack shaft 9 for operating a steering linkage (not shown). The valve sleeve 7 and the pinion shaft 8 are fitted together and fixed to each other by means of a pin 2b.

Indicated by 10 is a rack support which is urged by a spring 11 to press the rack shaft 9 against the pinion shaft 8 such that the backlash between the rack shaft 9 and the pinion shaft 8 can be removed and a smooth steering feel can be attained thereby. In the meantime, indicated by 12 is a plug doubling as a retainer for the spring 11.

The rack shaft 9 has attached thereto a power cylinder 13 which has a pair of cylinder chambers 15l and 15R defined on the opposite side of a piston 14 connected to the rack shaft 9.

Indicated by 16 is a torsion bar inserted into the input shaft 1. The torsion bar 16 has one end connected to the input shaft 1 by means of a pin 17 and another end connected to the output shaft 12 by means of serration 18. By this, the output shaft 2 is coupled with the input shaft 1 by way of the torsion bar 16 and is movable relative to the input shaft 1 by the effect of twisting or torsional deformation of the torsion bar 16.

Indicated by 20 is a control valve for controlling supply of working fluid to a power cylinder 13 in response to a steering effort supplied to the input shaft 1. The control valve 20 is disposed in contact with the housing 3 and structured as follows.

Indicated by 24 is a valve body of the control valve 20. The valve body 24 is formed with a spool accommodation hole 25 in parallel with the axis of the input shaft 1. The spool accommodation hole 25 is closed at one end thereof by means of a plug 26 and has a larger diameter portion 25a on the one end side (i.e., closed end side) and a smaller diameter portion 25b on the other end side. In the meantime, 27 is a stopper ring for preventing slipping off of the plug 26.

Indicated by 28 is a first valve spool disposed movably within the spool accommodation hole 25. The first valve spool 28 partitions the inside of the spool accommodation hole 25 into a first fluid chamber 29 on the one side and a second fluid chamber 30 on the other side. Further, the first valve spool 28 is partially reduced in outer diameter so as to define a third fluid chamber 31 which is located nearly at an axially central portion of the spool accommodation hole 25.

The third fluid chamber 31 is partitioned or fluidly separated from the first fluid chamber 29 when a poppet portion 28a which is located on the larger diameter portion 25a side of the spool accommodation hole 25 and formed into a tapered shape, is put into contact with a shoulder portion 25c of the spool accommodation hole 25 between the larger diameter portion 25a and the smaller diameter portion 25b and obstructs communication between the first fluid chamber 29 and the third fluid chamber 31. Accordingly, communication between the first fluid chamber 29 and the third fluid chamber 31 can be established by moving the first valve spool 28 toward the first fluid chamber 29 side and thereby causing the poppet portion 28a to go away from the shoulder portion 25c.

Further, the third fluid chamber 31 is partitioned or fluidly separated from the second fluid chamber 30 by means of a seal ring 32 provided to the outer periphery of the first valve spool 28.

The first fluid chamber 29 side end portion of the first valve spool 28 is axially extended to have an insertion shaft portion 28b which is inserted into a through hole 33 formed in the plug 26.

Further, a second fluid chamber 30 side end portion of the first valve spool 28 has a tapered inner or female surface portion 35.

Indicated by 36 is a communication fluid passage for providing communication between the first fluid chamber 29 and the second fluid chamber 30. In this embodiment, the communication fluid passage 36 is formed in first valve spool 28. That is, the communication fluid passage 36 consists of a diametrical through hole 36a and an axial hole 26b formed in the first valve spool 28. The through hole 36a is in communication with the first fluid chamber 29, and the axial hole 36b is in communication with the through hole 36a while opening to the second fluid chamber 30.

A second valve spool 37 is reciprocal within the spool accommodation hole 25 and disposed on the other side of the spool accommodation hole 25. In this embodiment, the second valve spool 37 has at one side thereof a tapered outer or male surface portion 38 tapering toward the first valve spool 28 and at the other side thereof a semi-spherical surface 39. Further, the other end portion of the second valve spool 37, i.e., the end portion having the semi-spherical surface 39 protrudes into a through hole 40 which is formed in the valve body 24 in a way as to intersect the spool accommodation hole 25 at right angles and in contact with an operating device of a conversion mechanism, which will be described hereinlater. In the meantime, the open end of the through hole 40 is closed by a plug plate 41.

Disposed within the first fluid chamber 29 is a spring 42 which has an end in contact with the plug 26 and another end in contact with the first valve spool 28 for thereby urging the first valve spool 28 toward the second fluid chamber 30 side. By this, under a normal condition of the first valve spool 28, the poppet portion 28a is brought into contact with the shoulder portion 25c of the spool accommodation hole 25 for thereby obstructing communication between the first fluid chamber 29 and the third fluid chamber 31.

Disposed within the second fluid chamber 30 is a discharge spring 43 which has an end in contact with the first valve spool 28 and another end in contact with second valve spool 37 for thereby urging the second valve spool 37 in the direction to cause the second valve spool 37 to project outward of the valve body 24. That is, the discharge spring 43 urges the second valve spool 37 in the direction as to cause the second valve spool 37 away from the first valve spool 28 and thereby hold them out of contact with each other, i.e., hold them in a condition in which the tapered female surface portion 35 and the tapered male surface portion 38 are not in contact with each other. For this reason, the second valve spool 37 in a normal condition does not close the communication fluid passage 36 formed in the first valve spool 28, by means of the second fluid chamber side end portion thereof but allows the communication fluid passage 36 to be held open.

The first fluid chamber 29 of the control valve 20 is communicated with a directional control valve which will be described in detail hereinlater, by way of a passage 44 formed in the valve body 24 and an inclined or slant hole or passage 45. Further, the second fluid chamber 30 is communicated with a drain passage 46, and the third fluid chamber 31 is communicated with a supply passage 47.

Indicated by 48 is an electromagnetic solenoid attached to the control valve 20. The electromagnetic solenoid 48 is operated or energized by way of a control unit 50 to which a signal representative of vehicle speed is supplied as an input and is capable of engaging at an armature 51 thereof with an insertion end 28b of the first valve spool 28 of the control valve 20 and thereby urging the first valve spool 28 toward the second fluid chamber 30 side. By this, the control characteristics of the control valve 20 can be made variable according to factors including a vehicle speed factor, thus making it possible to attain a so-called vehicle speed-responsive control.

Indicated by 53 is a conversion mechanism. The conversion mechanism 53 includes an operation rod 54 which serves as an operation device capable of operating the control valve 20 and converts a steering effort supplied to the input shaft 1 to movement of the operation device 54. The conversion mechanism 53 includes a movable plate 55 movable axially of the input shaft 1 which is housed in the housing 3 but not movable relative to the input shaft 1 and a motion conversion device 56 which is disposed between the movable plate 55 and a surface of the input shaft 22, which surface opposes to the movable plate 55, for converting relative rotation between the movable plate 55 and the input shaft 22 into axial movement. Further, the operation rod 54 capable of operating the control valve 20, is in engagement with the movable plate 55.

The movable plate 55 is annular and mounted on the input shaft 1, i.e., disposed in a way as to allow the input shaft 1 to extend through the central opening thereof. The movable plate 55 is connected to the input shaft 1 by way of axial pins 58 studded to a radial flange of the input shaft 1, in such a manner as to be axially movable but not rotatable relative to the input shaft 1. Further, by a spring 59 disposed between the movable plate 55 and the flange 57, the movable plate 55 is always urged in the direction to be apart from the flange 57.

The motion conversion device 56 has a plurality of pairs of inclined surfaces 60 provided to the movable plate 55 in a way as to incline in the direction of rotation of the movable plate 55 and a plurality of balls 61 each of which is brought into contact with each pair of inclined surfaces 60. The balls 61 are provided to a surface of the output shaft 2, which faces the movable plate 55, i.e., provided to an end surface of the valve sleeve 7 (refer to FIG. 4). With the foregoing structure, a steering effort on the input shaft 1 causes relative rotation between the input shaft 1 and the output shaft 2 and therefore the balls 61 to push the corresponding inclined surfaces 60, thus enabling the movable plate 55 to move axially against the bias of the spring 59, i.e., in the direction to be apart from the end face of the valve sleeve 7. In this instance, since each pair of inclined surfaces 60 incline oppositely in the direction of rotation of the movable plate 55, the movable plate 55 is caused to move in one axial direction irrespective of the direction of rotation of the input shaft 1 relative to the output shaft 2.

The above described operation rod (operation device) 54 is connected at a base end 54a to the movable plate 55 and extends through the housing 3 toward a free end 54b thereof where it is brought into contact with the semi-spherical surface 39 of the second valve spool 37. Further, the operation rod 54 is supported at a portion intermediate between the base end 54a and the free end 54b by means of a spherical bearing 62 attached to the housing 3 and is thus connected to the housing 3 so as to be pivotal or swingable by means of the spherical bearing 62. For this reason, the operation rod 54 is pivotal or swingable with the fulcrum at the spherical bearing 62, so that in response to upward movement of the base end 55a connected to the movable plate 55, when viewed in FIG. 1, the free end 55b is moved downward to operate the control valve 20.

Figure 3:
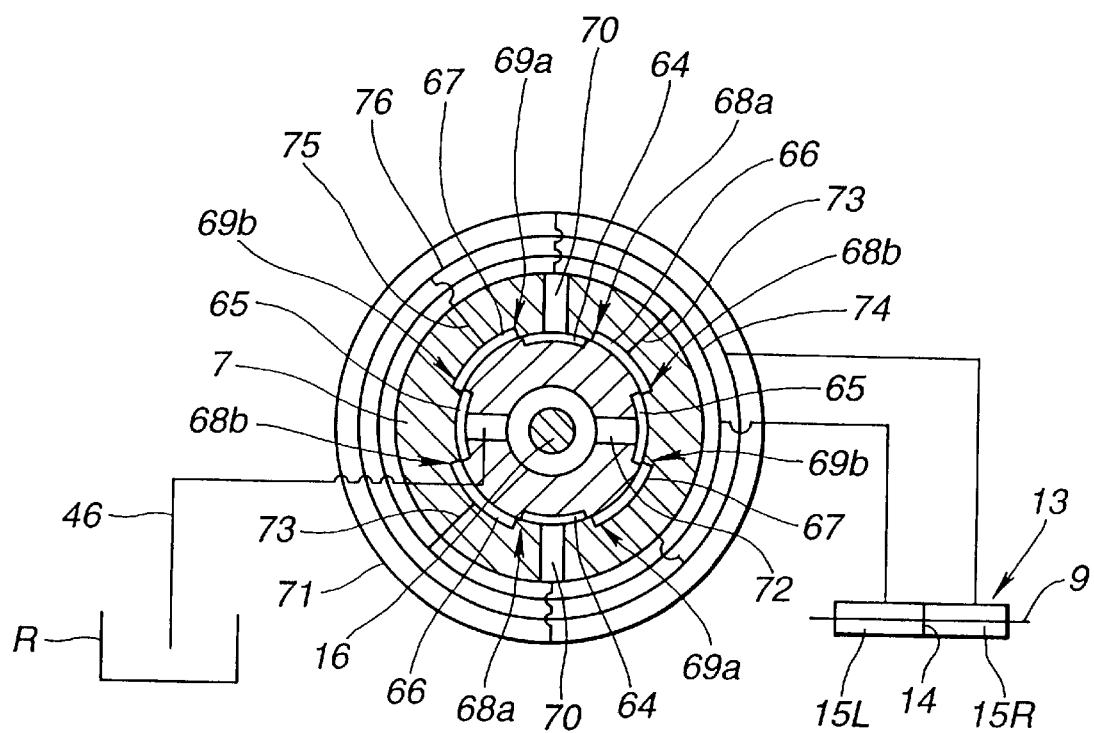
FIG. 3 is a sectional view taken along the line III—III of FIG. 1.
Figure 4:
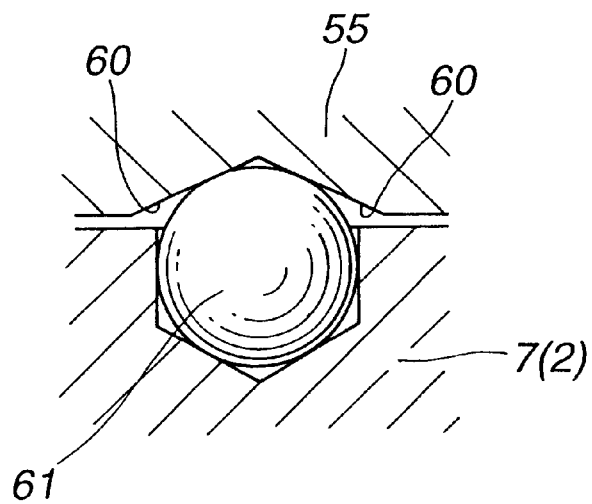
FIG. 4 is a sectional view taken along the line IV—IV of FIG. 1.

Indicated by 63 is a directional control valve disposed between the above described control valve 20 and the power cylinder 13. As best shown in FIG. 3, the directional control valve 63 in this embodiment is formed as a so-called rotary valve disposed between the input shaft 1 and the valve sleeve 7.

The directional control valve 63 switches supply of working fluid from one cylinder chamber 15L of the power cylinder 13 to the other cylinder chamber 15R or vice versa in response to a change of a direction of a steering effort on the input shaft while controlling discharge of working fluid from the cylinder chambers 15L and 15R.

In the outer circumferential surface of the input shaft 1 a plurality of depressions 64 and 65 with circumferentially equal intervals are formed, whereas in the inner circumferential surface of the valve sleeve 7 a plurality of depressions 66 and 67 with circumferentially equal intervals are formed in a way as to be respectively positioned between the depressions 64 and 65 and in a way as to form a plurality of restrictions 68a, 68b, 69a and 69b between the depressions 64, 65, 66 and 67.

The above described depression 64 is communicated through a passage 70 with a circumferential depression 71 formed in the outer circumference of the valve sleeve 7. The circumferential depression 71 is communicated with the first fluid chamber 29 of the control valve 20 by way of the slant hole 45, thus making it possible to introduce working fluid in the first fluid chamber 29 of the control valve 20 to the depression 64.

The depression 65 is communicated with a low pressure portion within the housing 3 by way of a passage 72, a space between the inner circumferential surface of the input shaft 1 and the outer circumferential surface of the torsion bar 16 and a through hole 2a formed in the output shaft 2, and communicated through the inside of the housing 3 with the drain passage 46.

The depression 66 is communicated through a passage 73 with a circumferential groove 74 formed in the outer circumferential surface of the valve sleeve 7, and communicated through the circumferential groove 74 with one cylinder chamber 15L of the power cylinder 13.

The depression 67 is communicated through a passage 75 with a circumferential groove 76 formed in the circumference of the valve sleeve 7, and through the circumferential groove 76 with another cylinder chamber 15R of the power cylinder 13.

Further, disposed on the opposite sides of the respective circumferential grooves 71, 74 and 76 are seal rings 77, 78, 79 and 80, whereby the circumferential grooves 71, 74 and 76 are fluidly separated from each other.

Indicated by 81 is a cut-off valve which is disposed so as to face the control valve 20 with the operation rod 54 of the conversion mechanism 53 being interposed therebetween. The cut-off valve 81 includes inner and outer, double cylinders 83 and 84 which are fixed in a cylinder accommodation hole 82 by screwing the outer cylinder 83 into the hole 82 and screwing the inner cylinder 84 into the outer cylinder 83. The cylinder accommodation hole 82 is formed in the valve body 24 which is common with the control valve 20. The cut-off valve 81 further includes a plunger 85 accommodated reciprocally within the inner cylinder 83. The cylinder accommodation hole 82 opens to the through hole 40, and the end of the plunger 85 projects into the through hole 40 so as to face the second valve spool 37 of the control valve 20 with the operation rod 54 being interposed therebetween.

Further, formed between the inner cylinder 83 and the plunger 85 is a pressure chamber 86. By the pressure within the pressure chamber 86, the plunger 85 is urged so as to project into the through hole 40. On the other hand, disposed between the outer cylinder 84 and the plunger 85 is a spring 87 which urges the plunger 85 toward the pressure chamber 86 side. When the pressure within the pressure chamber 86 is smaller than the bias of the spring 87, the plunger 85 is put into a condition of not contacting at the end thereof with the operation rod 54 of the conversion device 53 but facing the same with a predetermined space therebetween.

Introduced into the pressure chamber 86 of the cut-off orifice 81 is the working fluid within the first pressure chamber 29 of the control valve 20. That is, the passage 44 in communication with the first pressure chamber 29 of the control valve 20 is communicated with pressure chamber 86 through a passage 88 crossing the passage 44 at right angles, a passage 89 providing communication between the passage 88 and the cylinder accommodation hole 82, a circumferential groove 90 formed in the outer circumference of the outer cylinder 84 so as to communicate the passage 89, a through hole 91 opening to the bottom of the circumferential groove 90, a circumferential groove 92 formed in the outer circumferential surface of the inner cylinder 83 so as to communicate the through hole 91, and a through hole 93 opening to the bottom of the circumferential groove 92. By this, the working fluid within the first pressure chamber 29 of the control valve 20 is introduced into the pressure chamber 86.

Indicated by 95 is an oil pump for supplying working fluid to the supply passage 47. The supply passage 47 is provided with a check valve 96 which allows flow of working fluid from the oil pump 95 to the control valve 20 while checking flow of working fluid in the reverse direction. The supply passage 47 is further provided with, at a place downstream of the check valve 96, an accumulator 97 capable of holding the pressure within the supply passage 47 at a predetermined value.

Indicated by 98 is a motor for driving the oil pump 95. The motor 98 is controlled in accordance with a detection signal from a pressure switch 99 which monitors the pressure within the supply passage 47 at a place thereof downstream of the check valve 96 so as to be actuated or not selectively.

In the meantime, the through hole 40 formed in the valve body 24 is communicated with a reservoir 100 of working fluid by way of a drain passage 46. Further, the space 101 between the control valve 20 and the electromagnetic solenoid 48 is communicated through the slant hole 102 formed in the valve housing 3 with the low pressure section within the housing 3, and through the inside of the housing 3 with the drain passage 46.

With such a structure, when a steering wheel (not shown) connected to the input shaft 1 is operated to steer the vehicle and a steering effort is supplied to the input shaft 1, the steering effort is transmitted through the torsion bar 16 to the output shaft 2 and then through the rack shaft 9 to the steering linkage (not shown) to steer the vehicle.

In this instance, when the steering resistance is large, the torsion bar 16 is twisted to cause relative rotation between the input shaft 1 and the output shaft 2.

Relative rotation between the input shaft 1 and the output shaft 2 actuates the control valve 20 and the directional control valve 63 and supply or discharge working fluid to or from the power cylinder 13 so that a steering assist is provided by the working fluid, which will be described more in detail hereinafter.

Firstly, the working fluid in the supply passage 47 is pressurized by the accumulator 97 disposed downstream of the check valve 96 and is maintained normally at a predetermined pressure. That is, the pressure of the working fluid within the supply passage 47 is monitored by the pressure switch 99 so that when the pressure within the supply passage 47 becomes lower than a predetermined value the motor 98 is actuated in response to a detection signal from the pressure switch 99 and therefore the oil pump 95 is driven to cause the pressure of the working fluid within the supply passage 47 to become higher. On the other hand, when the pressure within the supply passage 47 rises up to a predetermined value, this is detected by the pressure switch 99 to stop the operation of the motor 98 and pump 95. Accordingly, working fluid normally held at a predetermined pressure is introduced into the third fluid chamber 31 of the control valve 20.

In this instance, there is no relative rotation between the input shaft 1 and the output shaft 2, i.e., when steering in a straight-ahead position the movable plate 55 of the conversion mechanism 53 is urged by the spring 59 to cause the pair of inclined surfaces 60 of the motion conversion device 56 to contact altogether with the ball 61 (refer to FIG. 4), so the operation rod 54 is in a neutral position shown in FIG. 1 and thus does not operate the control valve 20. Due to this, the first valve spool 28 and the second valve spool 37 of the control valve 20 are both in a neutral condition shown in FIG. 1, so the control valve 20 is in a condition of shutting off supply of working fluid to the directional control valve 63 and the power cylinder 13.

The first valve spool 28 of the control valve 20, when in a normal condition, partitions the first fluid chamber 29, the second fluid chamber 30 and the third fluid chamber 31 within the spool accommodation hole 25, so that mutual communication of the fluid chambers 29, 30 and 31 are obstructed. That is, the first valve spool 28 is urged by the supply spring 42 toward the second fluid chamber 30 side to bring the poppet portion 28a of he first valve spool 28 in contact with the shoulder portion 25c of the spool accommodation hole 25 to obstruct communication between the first fluid chamber 29 and the third fluid chamber 31. Further, the second fluid chamber 30 and the third fluid chamber 31 are sealingly separated from each other by means of the seal ring 32. That is, the third fluid chamber 31 with which the supply passage 47 of working fluid is communicated is fluidly separated from the first fluid chamber 29 communicating the circumferential groove 71 of the directional control valve 63 and the second fluid chamber 30 communicating the drain passage 46. Due to this, the working fluid supplied to the third fluid chamber 31 is not supplied therefrom to either of the directional control valve 63 and the drain passage 46.

Further, while the second valve spool 37 is urged by the discharge spring 43 in the direction to project from the valve body 24, its semi-spherical surface 39 at its end, when it is in a normal condition, is not pushed by the operation rod 54 which serves as an operation means for the conversion mechanism 53, thus allowing the communication fluid passage 36 for communication between the first fluid chamber 29 and the second fluid chamber 30 in a condition of establishing communication between them. That is, the second valve spool 37 is urged by the discharge spring 43 in the direction to project from the valve body 24, whereby the second valve spool 37 goes apart from the first valve spool 28 to hold the tapered female surface portion 35 of the first valve spool 28 and the tapered male surface portion 38 of the second valve spool 37 in a condition of being out of contact from each other. Due to this, the second valve spool 37 never closes at the second fluid chamber 30 side end thereof the communication fluid passage 36 formed in the first valve spool 28 but allows the communication passage 36 to be held open. Accordingly, the first fluid chamber 29 in communication with the directional control valve 63 is communicated with the drain passage 46 in communication with the second fluid chamber 30.

When, under the above described condition, a steering effort is supplied to the input shaft 1 by way of the steering wheel (not shown) and the torsion bar 16 is twisted to cause relative rotation between the input shaft 1 and the output shaft 2, the operation rod 54 of the conversion mechanism 53 actuates the end portion of the second valve spool 37 and urges the second valve spool 37 to move axially against the bias of the discharge spring 43.

Specifically, relative rotation between the input shaft 1 and the output shaft 2 brings each ball 61 of the motion conversion device 56 into contact with only one of the corresponding pair of inclined surfaces 60 formed in the movable plates 55, thus causing the movable plate 55 to move upward when viewed in FIG. 1. By this, the operation rod 54 which is connected at the base end 54a to the movable plate 55 and is supported by the spherical bearing 62 is caused to swing, so that the free end 54b of the operation rod 54 is caused to move downward when viewed in FIG. 1 and thus pushes the end portion (semi-spherical surface 39) of the second valve spool 37. As a result, the second valve spool 37 is pushed by the operation rod 54 serving as an operation means and moves axially in proportion to the amount of relative rotation between the input shaft 1 and the output shaft 2.

When the operation rod 54 urges the second valve spool 37 of the control valve 20 to move axially, the second valve spool 37 is caused to close the communication fluid passage 36 for providing communication between the first fluid chamber 29 and the second fluid chamber 30.

That is, when the second valve spool 37 is moved against the bias of the discharge spring 43 toward the first valve spool 28 side, the second valve spool 37 is brought into contact with the first valve spool 28 to cause the tapered female surface portion 35 of the first valve spool 28 and the tapered male surface portion 38 of the second valve spool 37 to contact with each other. Due to this, the second valve spool 37 shuts off at the second fluid chamber 30 side end thereof the communication fluid passage 36 formed in the first valve spool 28 and thus blocks up the communication passage 36. Accordingly, comwnication between the first fluid chamber 29 in communication with the directional control valve 63 and the drain passage 46 in communication with the second fluid chamber 30 is blocked.

Further, when the operation rod 54 urges the second valve spool 37 to move axially and the second valve spool 37 is brought into contact with the first valve spool 28, the first valve spool 28 is urged axially against the bias of the supply spring 42 to move toward the fist fluid chamber 29 side.

Movement of the first valve spool 28 toward the first fluid chamber 29 side provides communication between the first fluid chamber 29 and the third fluid chamber 31. By this, the working fluid introduced from the third fluid chamber 31 in communication with the supply passage 47 to the first fluid chamber 29 is supplied by way of the directional control valve 63 to the power cylinder 13.

That is, when a steering effort in one constant direction is supplied to the input shaft 1 and the first valve spool 28 within the spool accommodation hole 25 is moved toward the first fluid chamber 29 side, the poppet portion 28a formed in the first valve spool 28 goes apart from the shoulder portion 25c between the larger diameter portion 25a and the smaller diameter portion 25b of the spool accommodation hole 25, thus establishing communication between the first fluid chamber 29 and the third fluid chamber 31. By this, the working fluid supplied from the supply passage 47 to the third fluid chamber 31 is introduced to the first fluid chamber 29. Then, from the first fluid chamber 29 the working fluid is introduced into the directional control valve 63 through the slant hole 45 and the circumferential groove 71 and supplied to one cylinder chamber 15L of the power cylinder 13 under the control of the directional control valve 63 (in case of steering effort in the reverse direction, the working fluid is supplied to another cylinder chamber 15R).

In this instance, under the condition where there is no relative rotation between the input shaft 1 and the output shaft 2, i.e., when steering in a straight-ahead position, the directional control valve 63 is in a condition where the restrictors 68a and 69a are closed whereas the restrictors 68b and 69b are opened a little. By this, the cylinder chamber 15L of the power cylinder 13 is communicated with the drain passage 46 by way of the circumferential groove 74, passage 73, restrictor 68b, depression 65 and passage 72, while another cylinder chamber 15R is communicated with the drain passage 46 by way of the circumferential groove 76, passage 75, restrictor 69b and depression 65.

When, under this condition, a steering effort is supplied to the input shaft 1 by way of the steering wheel (not shown), the torsion bar 16 is twisted to cause relative rotation between the input shaft 1 and the output shaft 2, thus allowing the restrictor 68a of the directional control valve 63 to open and the restrictor 68b to close (in case of steering effort in the reverse direction the restrictor 69a opens and the restrictor 69b closes). By this, the working fluid supplied from the control valve 20 to the circumferential groove 71 through the slant hole 45 is introduced from the passage 70 to one cylinder chamber 15L of the power cylinder 13 by way of the restrictor 68a (in case of steering effort in the reverse direction, the working fluid is introduced from the passage 70 to another cylinder chamber 15R by way of the restrictor 69a).

That is, the action of introducing working fluid to the directional control valve 63 by means of the control valve 20 and the action of selectively switching supply of working fluid from one cylinder chamber 15L to another cylinder chamber 15L of the power cylinder 13 or vice versa by means of the directional control valve 63 are executed nearly at the same time.

When the control valve 20 supplies working fluid to the power cylinder 13 by way of the directional control valve 63 and the balance of three factors, i.e., a steering effort supplied to the input shaft 1, the pressure within the one cylinder chamber 15L of the power cylinder (or the pressure within the other cylinder chamber 15R in case steering effort is in the reverse direction) and the bias of the supply spring 42, varies gradually as the steering effort increases, the first valve spool 28 of the control valve 20 moves and operates as follows.

When the poppet portion 28a of the first valve spool 28 goes apart from the shoulder portion 25c of the spool accommodation hole 25 to allow working fluid to be supplied from the first fluid chamber 29 to the power cylinder 13 and thereby cause, for example, the pressure within the one cylinder chamber 15L to rise to provide a steering assist, it become possible to reduce the steering effort to be supplied from the steering wheel (not shown) to the input shaft 1 by the amount proportional to the steering assist provided by the power cylinder 13. At the same time, the pressure within the first fluid chamber 29 increases with increase of the pressure within the cylinder chamber 15L, so the first valve spool 28 is urged backward by the pressure within the first fluid chamber 29 to bring the poppet portion 28a into contact with the shoulder portion 25c of the spool accommodation hole 25, thus obstructing communication between the fist fluid chamber 29 and the third fluid chamber 31. Further, when, for turning the vehicle, the steering effort supplied to the input shaft 1 increases, the poppet portion 28a goes apart from the shoulder portion 25c of the spool accommodation hole 25 again, thus allowing working fluid to be supplied to one cylinder chamber 15L of the power cylinder 13. Thereafter, the above operation is repeated until a predetermined steering assist in response to a steering effort supplied to the input shaft 1 is obtained.

That is, the first valve spool 28 of the control valve 20 repeats an action of supplying working fluid to the power cylinder 13 with the poppet portion 28a being apart from the shoulder portion 25c of the spool accommodation hole 25 and an action of stopping the supply of working fluid with the poppet portion 28a being in contact with the shoulder portion 25c of the spool accommodation hole 25 until a predetermined assistance is obtained after a steering effort is supplied to the input shaft 1 to cause relative rotation between the input shaft 1 and the output shaft 2.

Accordingly, twist of the above described torsion bar 16 is only within the range capable of causing the poppet portion 28a to be just apart or out of contact from the shoulder portion 25c of the spool accommodation hole 25, and relative rotation between the input shaft 1 and the output shaft 2 is also within that range.

On the other hand, when working fluid is supplied from the control valve 20 to one cylinder chamber 15L of the power cylinder 13 by way of the directional control valve 63, the other cylinder chamber 15R of the power cylinder 13 is communicated with the drain passage 46 through the circumferential groove 76, passage 75, depression 67, restrictor 69b, depression 65 and passage 67.

Thus, by the pressure of the working fluid introduced to one cylinder chamber 15L of the power cylinder 13, a force in the direction of steering is applied to the rack shaft 9 by way of the piston 14, thus providing a steering assist.

By this, a predetermined steering assist in response to the steering effort on the input shaft 1 is obtained by the effect of the working fluid supplied to the power cylinder 13.

When the steering operation is completed and the input shaft 1 is released from the steering effort, the first valve spool 28 of the control valve 20 is returned to the second fluid chamber 30 side by the pressure within the first fluid chamber 29 and the bias of the spring 42, thus causing the poppet portion 28a of the first valve spool 28 to contact the shoulder portion 25c of the spool accommodation hole 25 to obstruct communication between the first fluid chamber 29 and the third fluid chamber 31.

Further, the second valve spool 37 is pushed back gradually in the direction of going apart from the first valve spool 28 by the pressure within the second fluid chamber 30 (this pressure is equal to the pressure within the cylinder chamber of the power cylinder 13, e.g., the cylinder chamber 15L, to which working fluid is supplied) and the bias of the discharge spring 43, thus holding the tapered female surface portion 35 of the first valve spool 28 and the tapered male surface portion 38 of the second valve spool 37 in a condition of being out of contact with each other. Due to this, the second valve spool 37 opens at the second fluid chamber 30 side end thereof the communication fluid passage 36 formed in the first valve spool 28, thus allowing the communication fluid passage 36 to open. By this, the first fluid chamber 29 in communication with one cylinder chamber 15L of the power cylinder 13 is communicated with the drain passage 46, thus allowing the cylinder chamber 15L to be drained and introduce thereinto the atmospheric pressure.

Simultaneously with this, the directional control valve 63 returns to the neutral position, thus communicating the cylinder chambers 15L and 15R of the power cylinder 13 with the drain passage 46 by way of the center open type restrictors 68b and 69b.

In this instance, when the balance of three factors, i.e., a steering effort on the input shaft 1, the pressure remaining within one cylinder chamber 15L of the power cylinder (or the pressure within another cylinder chamber 15R in case steering effort is in the reverse direction) and the bias of the supply spring 42, varies gradually as the steering effort reduces, the second valve spool 37 of the control valve 20 moves to open the communication fluid passage 36 gradually.

That is, when the second valve spool 37 opens the communication fluid passage 36 a little, the pressure within the one cylinder chamber 15L of the power cylinder 13 reduces a little, thus reducing a steering assist. When the assist by means of the power cylinder 13 reduces, the steering effort remaining in the input shaft 1 prevails in the control, thus causing the second valve spool 37 to contact the first valve spool 28 and close the communication fluid passage 36. When the steering effort on the input shaft 1 is released further for completing the steering operation, the second valve spool 37 goes apart from the fist valve spool 28 again to open the communication fluid passage 36, thus releasing the working fluid within one cylinder chamber 15L of the power cylinder 13 to the drain passage 46. Thereafter, the above described operation is repeated until the steering effort supplied to the input shaft 1 and the steering assist by the power cylinder 13 become zero.

That is, decrease of relative rotation between the input shaft 1 and the output shaft 2 resulting from decrease of the steering effort supplied to the input shaft 1 causes the second valve spool 37 of the control valve 20 to perform an action of being held apart from the first valve spool 28 to open the communication fluid passage 36 and an action of being brought into contact with the first valve spool 28 to close the communication fluid passage 36 alternately until the steering assist becomes zero.

On the other hand, in case the steering wheel (not shown) is steered in the reverse direction, each ball 61 of the motion conversion device 56 is made to contact only the other of the corresponding pair of inclined surface 60 formed in the movable plate 55. However, the movable plate 55 is moved upward when viewed in FIG. 1, so the control rod 54 actuates the control valve 20 similarly as described above. In contrast to this, the directional control valve 63 operates in the direction reverse to that as described above, to open the restrictors 69a and 68b and the restrictors 69b and 68a. By this, the directional control valve 63 supplies working fluid from the control valve 20 to the other cylinder chamber 15R of the power cylinder 13 by way of the restrictor 69a while at the same time allowing one cylinder chamber 15L to be communicated with the drain passage 47 by way of the restrictor 68a.

By this, similarly as described above, a predetermined steering assist proportional to the steering effort on the input shaft 1 is obtained by working fluid supplied to the power cylinder 13.

In this instance, the electromagnetic solenoid 48 will operate as follows. That is, the electromagnetic solenoid 48 is driven and controlled on the basis of the speed signal from the vehicle speed sensor 49. The armature 51 of the electromagnetic solenoid 48 urges the first valve spool 28 toward the second fluid chamber 30 side.

The electromagnetic solenoid 48 provides a resistance to a pushing force which urges the second valve spool 37 against the bias of the discharge spring 43 and which results when the end portion (semi-spherical surface 39) of the second valve spool 37 of the control valve 20 is operated by the operation rod 54 of the conversion mechanism 53.

Figure 5:
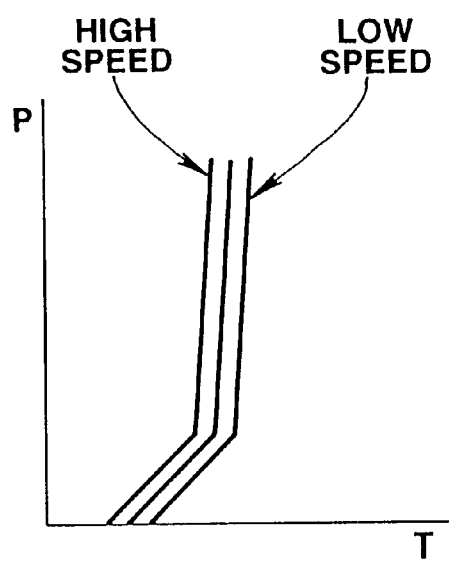
FIG. 5 is a graph of a relation between steering effort or torque (T) supplied to an input shaft and working fluid pressure (P) for producing steering assist, using vehicle speed as a parameter.

Due to this, when a steering effort is supplied to the input shaft 1 and the operation rod 54 of the conversion mechanism 53 operates the control valve 20 to increase the pressure within the first fluid chamber 29, the control characteristics of the control valve 20 includes a vehicle speed factor so that the characteristics of the hydraulic pressure (P) for the steering torque (T) varies in response to vehicle speed as shown in FIG. 5 and a vehicle-speed responsive control is performed.

Further, the above described cut-off valve 81 operates as follows. The cut-off valve 81 is controlled on the basis of the hydraulic pressure within the first fluid chamber 29 of the control valve 20, which is introduced through the passage 88, and the plunger 85 of the cut-off valve 81 operates the operation rod 54 of the conversion mechanism 53.

The hydraulic pressure within the first pressure chamber 29 of the control valve 20 is introduced through the passage 88 to the inside of the pressure chamber 86 of the cut-off valve 81. The control valve 20 is operated by the operation rod 54 of the conversion mechanism 53 to cause the hydraulic pressure within the first fluid chamber 29 to increase, whereby the plunger 85 protrudes into the through hole 40 by the balance between the pressure within the pressure chamber 86 and the bias of the spring 87 and provides, after a predetermined stroke, an assist for the force with which the operation rod 54 of the conversion mechanism 53 pushes the second valve spool 37 against the bias of the discharge spring 43.

Due to this, when a steering effort is supplied to the input shaft 1 and the operation rod 54 of the conversion mechanism 53 operates the control valve 20 to increase the hydraulic pressure within the first fluid chamber 29, it is carried out a control of such characteristics in which after a cut-off point where the pressure within the first fluid chamber 29 of the control valve 20 rises up to a predetermined value, the proportion of increase of steering torque (T) to that of hydraulic pressure (P) increases (refer to FIG. 5).

In this connection, the control valve 20 which controls supply of working fluid to the power cylinder 13 is one, and one control valve 20 is operated in response to steering torque, irrespective of the direction of steering, i.e., both in case of steering in the left-hand direction and in case of steering in the right-hand direction.

Accordingly, it becomes possible to obtain a power steering system which is small-sized in its overall size and lower in the manufacturing cost.

Further, since the conversion mechanism 53 for converting the steering effort on the input shaft 1 to movement of the operation rod 54 is constituted by the movable plate 55 connected to the operation rod 54 and the motion conversion device 56 by using them as main elements, the conversion mechanism 53 can be simplified.

Further, the operation rod 54 of the conversion mechanism 54 is pivotally or swingably connected to the housing 3 by way of the spherical surface bearing 62, so it becomes possible to selectively vary a so-called leverage by selecting the pivotal connecting point, thus making it possible to selectively decide movement of the free end of the operation rod 54 connected to the movable plate 55 for movement of the base end thereof.

Further, the above described motion conversion device 65 of the conversion mechanism 53 is comprised of a pair of inclined surfaces 60 and a ball 61, so the movable plate 55 can be moved in a predetermined direction in accordance with steering effort and irrespective of the direction of rotation of the movable plate 55 relative to the output shaft 2.

Further, since the control valve 20 is arranged in parallel with the input shaft 1, its amount of projection in the radial direction of the input shaft 1 can be smaller as compared with the case in which the control valve 20 is arranged nearly perpendicular to the input shaft 1, thus making it possible to make smaller the overall size of the system.

Further, since the working fluid passage (slant hole 45) between the directional control valve 63 and the control valve 20 is formed in the housing 3, piping or the like means can be dispensed with.

Further, since the above described cut-off valve 81 is arranged in series with the control valve 20, its amount of projection in the radial direction of the control valve 20 can be small, thus making it possible to make smaller the system in the overall size.

While the present invention has been described and shown as above, it is not for the purpose of limitation but various variations and modifications thereof can be made within the scope of the appended claims. For example, while the above described directional control valve 63 has been described and shown as being a so-called rotary valve, it can otherwise be constituted by a valve spool.

Further, while the cut-off valve 81 has been described and shown as being disposed opposite to control valve 20 with the operation rod 54 which serves as an operation means being interposed therebetween, it will do to dispose a second operation rod at a second position different from the position of the operation rod 54 and dispose the cut-off valve 81 at such a position that enables the cut-off valve 81 to be operated by the second operation rod. In this instance, whether to pivotally connect the second operation rod to the housing 3 or not can be selected optionally in relation to the position where the cut-off valve 81 is disposed. In case of such arrangement, the actuating force of the cut-off valve 81 is transmitted from the second operation rod to the movable plate 55 and then from the movable plate 55 to the control valve 20 by way of the operation rod 54.

What is claimed is:

1. A power steering system for providing a steering assist through control of supply and discharge of working fluid to and from a pair of cylinder chambers of a power cylinder in response to a steering effort on an input shaft of a steering gear, the power steering system comprising:

a conversion mechanism having an operating device, for converting a steering effort on the input shaft to movement of said operating device;

a control valve operatively connected to said operating device for controlling the supply and discharge of working fluid to and from said cylinder chambers of said power cylinder in response to said movement of said operating device;

said control valve shutting off the supply of working fluid to said power cylinder when steering in a straight-ahead position; and a directional control valve disposed between said control valve and said power cylinder for switching the supply of working fluid from one of said cylinder chambers to the other in response to a direction of steering effort on the input shaft while controlling discharge of working fluid from said cylinder chambers.

2. A power steering system according to claim 1, wherein said conversion mechanism comprises:

a housing rotatable receiving said input shaft;

an output shaft connected to said input shaft in a way as to be rotatable relative to said input shaft and outputting steering effort supplied to said input shaft;

a movable plate connected to said input shaft in a way as to be movable axially of said input shaft but incapable of rotating relative to same;

said output shaft having a facing surface facing said movable plate; and a motion conversion device disposed between said movable plate and said facing surface of said output shaft for converting relative rotation between said movable plate and said output shaft into axial movement of said movable plate;

said operation device being in the form of an operation rod which is connected at a base end thereof to said movable plate and extending toward a free end thereof through said housing, said operation rod being capable of operating said control valve at said free end.

3. A power steering system according to claim 2, wherein said operation rod has between said base end and said free end an intermediate portion swingably connected to said housing.

4. A power steering system according to claim 2, wherein said motion conversion device comprises a pair of inclined surfaces provided to one of said facing surface of said output shaft and said movable plate, and a projection provided to the other of said facing surface of said output shaft and said movable plate and in contact with said inclined surfaces.

5. A power steering system according to claim 1, wherein said control valve comprises a valve spool movable axially by being operated by said operation device, said valve spool being disposed in parallel with said input shaft.

6. A power steering system according to claim 1, wherein said directional control valve is disposed between an outer circumferential surface of said input shaft and an inner circumferential surface of said output shaft.

7. A power steering system according to claim 1, wherein said directional control valve is disposed between an outer circumferential surface of said input shaft and an inner circumferential surface of said output shaft, said control valve being in contact with said housing.

8. A power steering system according to claim 1, further comprising a cut-off valve for providing an assist to an operation of said operation device of said conversion mechanism for operating said control valve, said cut-off valve being disposed so as to face said control valve with said operation device of said conversion mechanism being disposed therebetween.

9. A power steering system comprising:

a power steering gear having an input shaft and an output shaft;

a power cylinder operatively connected to said input shaft and having a pair of cylinder chambers;

a conversion mechanism having an operating device, for converting a steering effort on said input shaft to movement of said operating device;

a control valve operatively connected to said operating device for variably controlling supply and discharge of working fluid to and from said cylinder chambers in response to said movement of said operating device;

said control valve shutting off supply of working fluid to said power cylinder when steering in a straight-ahead position; and a directional control valve disposed between said control valve and said power cylinder for selecting one of said cylinder chambers to be supplied with working fluid from said control valve in response to a direction of a steering effort on said input shaft while controlling discharge of working fluid from said cylinder chambers.

10. A power steering system according to claim 9, wherein said conversion mechanism comprises:

an annular movable plate fitted on said input shaft in a way as to be movable axially of said input shaft but incapable of rotating relative to same;

an annular surface element having an annular facing surface facing said movable plate; and a motion conversion device disposed between said movable plate and said facing surface for converting relative rotation between said input shaft and said output shaft into axial movement of said movable plate.

11. A power steering system according to claim 10, wherein said annular surface element is integral with said output shaft and constituting part of an axial end portion of said output shaft.

12. A power steering system according to claim 11, further comprising a housing rotatable receiving therein said input shaft and said output shaft, said operating device being in the form of an operation rod swingably supported at an intermediate portion between a first end and a second end thereof on said housing, said first end of said operation rod being operatively connected to said control valve for controlling operation of said and said second end being operatively connected to said movable plate for movement together with same.

13. A power steering system according to claim 12, wherein said motion conversion device comprises a pair of inclined surfaces provided to one of said facing surface element and said movable plate, and a projection provided to the other of said facing surface element and said movable plate.

14. A power steering system according to claim 13, wherein said control valve comprises a valve spool in contact with said first end of said operation rod and movable axially by being operated by said operation rod, said valve spool being disposed so as to have an axis in parallel with an axis of said input shaft.

* * * * *